March 19, 1968 B. F. QUINTILIAN 3,373,487
ELECTROSTATIC PRECIPITATOR ELECTRODE HANDLING SYSTEM
Filed Dec. 6, 1966 2 Sheets-Sheet 1
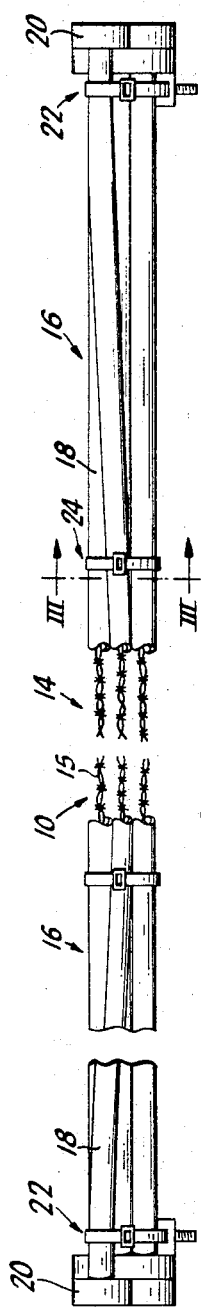
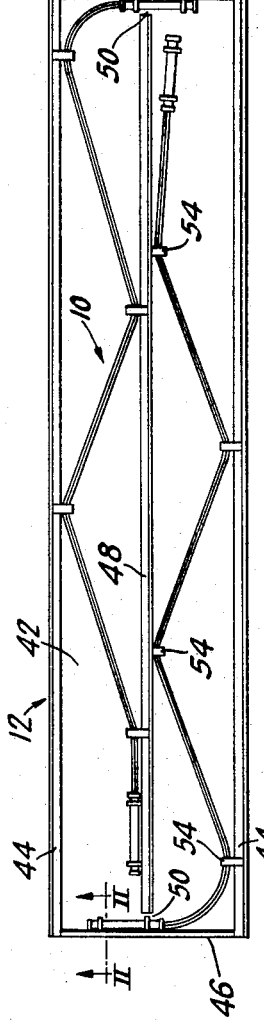
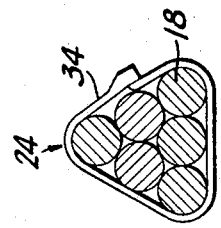
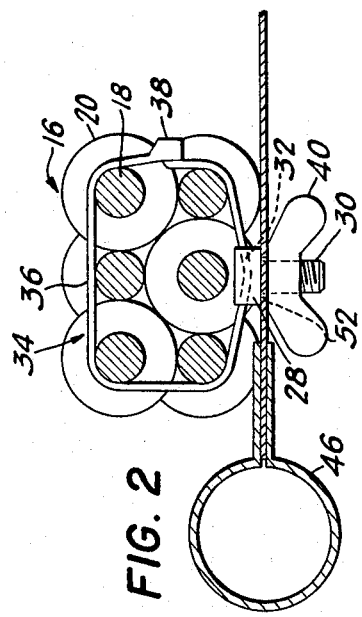
INVENTOR.
BARTHOLOMEW F. QUINTILIAN
BY
Boyce C. Dent
Attorney March 19, 1968     B. F. QUINTILIAN     3,373,487
ELECTROSTATIC PRECIPITATOR ELECTRODE HANDLING SYSTEM
Filed Dec. 6, 1966     2 Sheets-Sheet 2
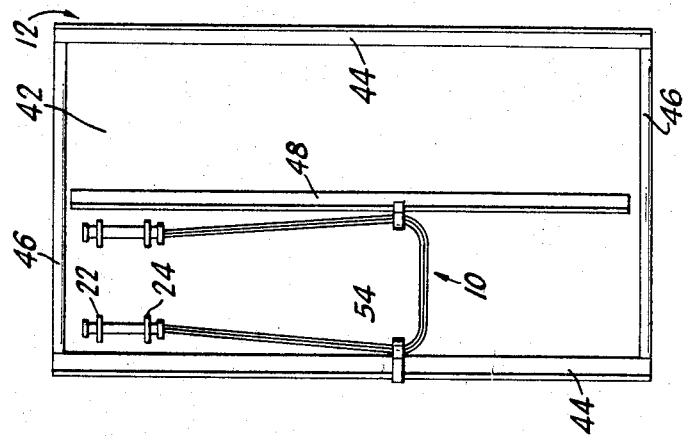
FIG. 8
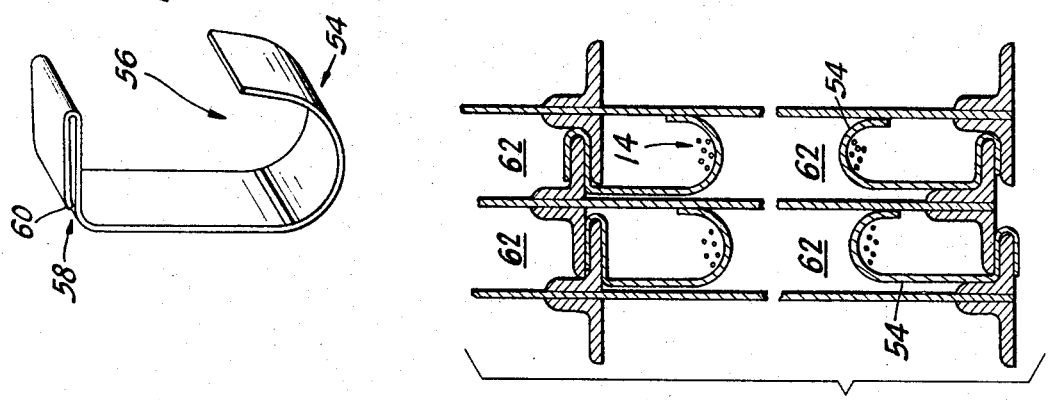
FIG. 6
FIG. 7
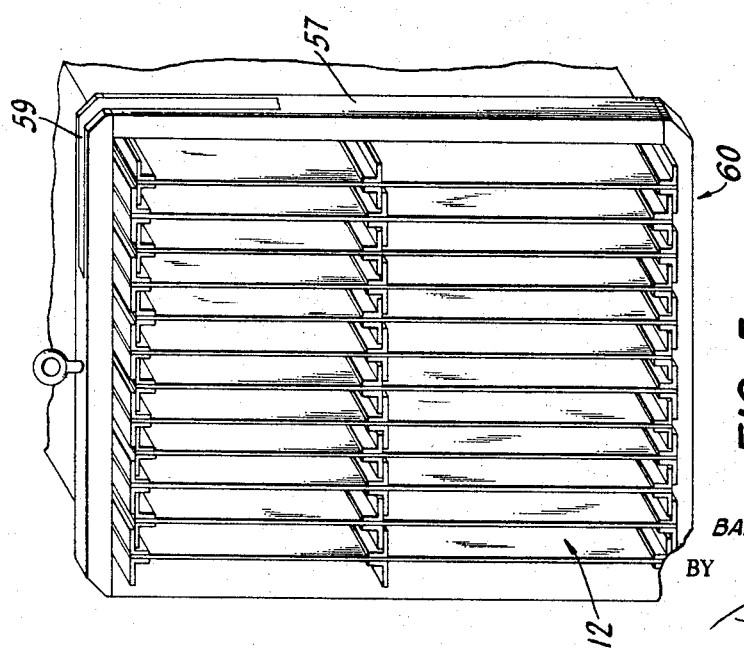
FIG. 5
INVENTOR.
BARTHOLOMEW F. QUINTILIAN
BY
Boyce C. Went
Attorney

# United States Patent Office 3,373,487
Patented Mar. 19, 1968

3,373,487
ELECTROSTATIC PRECIPITATOR ELECTRODE
HANDLING SYSTEM
Bartholomew F. Quintilian, Baltimore, Md., assignor to Koppers Company, Inc., a corporation of Delaware
Filed Dec. 6, 1966, Ser. No. 599,637
7 Claims. (Cl. 29—624)

ABSTRACT OF THE DISCLOSURE

A system is provided for handling discharge and collector electrodes for electrostatic precipitators for the purpose of simplifying shipping and erection of such electrodes. A cluster of discharge wire electrodes are mounted in sinuous or serpentine fashion to one face of a collector electrode plate so that the collector electrode can be erected with the wire electrodes in place. The wire electrodes are thereby positioned for simple suspension on the supporting structure.

Background of the invention

*Field of the invention.*—This invention relates generally to electrostatic precipitators and more particularly to electrode retaining and supporting structures.

*Description of the prior art.*—Conventional electrostatic precipitators contain both discharge and collector electrodes. When in operation, the discharge electrodes of the precipitators are generally in the form of wires suspended in a particle collecting zone or lane between collector electrodes which are in the form of substantially flat plates suspended from supporting structure. In the conventional method of erecting the precipitator, the electrodes are placed in the precipitator at the job site and this involves lifting each individual collector plate into position for securing it to supporting structure provided for that purpose. Thereafter, each individual discharge electrode wire must be placed upward or downward between the already erected collector plates and secured to the discharge electrode supporting structure. Usually, several discharge wires are spaced from but are coplanar with each collector plate. It is costly to provide separate shipping containers for the wires that are to constitute the discharge electrodes, and it is time-consuming and difficult to mount the individual wires in the precipitator.

Summary of the invention

The present invention provides a system for simplifying the shipping and erection of the electrodes for electrostatic precipitators. In accordance with this invention a cluster of discharge electrode wires are mounted prior to shipping to one face of a collector electrode in sinuous or serpentine fashion by suitable anchors. The collector electrode plates usually have a stiffening bead along both longitudinal and lateral edges. When the collector electrode is packed as a pack, cells are provided between the plates due to these stiffening beads. The discharge wire clusters are fitted in accordance with this invention in these cells. This obviates the need for separate shipping containers for the electrode wires.

Once the pack arrives at the job site, the collector plates can be lifted in position with the discharge wires still secured to the collector plates. Thus, the ends of the wires are approximately in position for mounting to their supporting structure. Once the collector plates are secured in position in the precipitator shell, the cluster is released from the collector plate except for the uppermost anchor. A firm tug on the bottom of the cluster is sufficient to release all anchors except the upper one so that the cluster hangs freely. Thereafter, the worker can release the upper anchor and, holding the cluster in his hand, easily hang each individual electrode wire in its socket in the supporting structure. This obviates the need that had existed heretofore for lifting each wire up or down through the collecting zones for attachment to the supporting structure. Much labor and time are saved.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

Brief description of the drawings

In the drawings wherein like parts are marked alike:

FIGURE 1 shows a cluster of discharge electrode wires banded together for mounting to a collector electrode plate;

FIGURE 2 is a cross-sectional view taken along the line II—II of FIG. 4 showing the mounting of the cluster to a collector electrode near its end by an anchor band;

FIGURE 3 is a cross-sectional view of the cluster taken along the line III—III of FIG. 1 showing the band used for banding the cluster inwardly of the anchor band;

FIGURE 4 is a side view of a collector plate having two clusters secured thereto in serpentine fashion;

FIGURE 5 is an isometric view of a pack of collector plates nested for shipment with the cells formed by nesting containing clusters of wire electrodes with the electrode clusters are omitted for clarity;

FIGURE 6 is an isometric view of the cluster clip used to secure the clusters to the collector plates;

FIGURE 7 is a detailed partial end view of the pack of FIG. 5; and

FIGURE 8 illustrates an alternate embodiment of FIG. 4.

Description of the preferred embodiment

Referring now to FIG. 4, there is illustrated a cluster of discharge wire electrodes 10 secured to a collector electrode plate 12. While the individual wires 14 may be so secured, preferably the wires are joined as a cluster 10. The cluster 10 is secured to plate 12 in serpentine fashion because the individual wires 14 of cluster 10 are usually longer than plate 12. In this manner, the total length of cluster 10 is contained within the length of plate 12. Another reason for this method of securing the cluster is to facilitate removal of the cluster during erection of the electrodes at the construction site. This will be described in detail further in the specification.

Cluster 10, FIG. 1, comprises a number of discharge wires 14, for example, six wires, banded together to form the cluster. The number of wires depends on how many are to be placed in the collection zone or lane opposite each plate 12. The wires 14 are conventional and may be formed from round wire, square wire, or barbed wire 15 as illustrated. Both ends of each wire 15 are attached to a shroud 16 in the conventional manner. Shrouds 16 have a round shank 18 with an enlarged head portion 20 on the outer end adapted for hanging in a socket on the electrode supporting structure (not shown). The shroud 16 on the opposite end of the wire 15 fits into a socket provided on a weight (not shown) to maintain the wires 14 taut when hanging in the precipitator. It should be understood that various types of shroud connections are used which do not affect the utility of this invention.

To assemble wires 14 in a cluster, an anchor band 22 is provided near the head 20 to tightly band the shrouds 16 together as shown in FIG. 1. A shank band 24 bands the shroud shanks 18 tightly together near the point of connection to the wires 15. The wires 14 are themselves banded together at intervals with masking tape (not shown) until the cluster is mounted to the collector plate 12 after which the tape is removed.

Anchor band 22, as illustrated in FIG. 2, is a conventional TY–RAP bolt base, type TC–107, made by The Thomas & Betts Co., Elizabeth, N.J. Anchor band 22 is made of a plastic material and comprises a rectangular head portion 28 integrally formed with a threaded shank portion 30. Head portion 28 has a slot 32 formed therein through which a plastic TY–RAP tie 34, type TY–25M, is passed. Tie 34 is in the form of a strap 36 with an enlarged end portion 38 through which strap 36 is passed. A steel tooth (not shown) is held captive in end portion 38 and engages strap 36 to prevent its being withdrawn from end portion 38. Thus, tie 34 tightly bands shrouds 16 together when strap 36 is passed around them and through head portion 28 and enlarged end portion 38. A pistol type installation tool (not shown) can be used to draw strap 36 tautly through end portion 38 and cut off the tail of strap 36. A pistol type tool, No. WT–195F made by the aforementioned company is suitable for this purpose. A wing nut 40 is provided for mounting the anchor band 22 to collector plate 12.

Shank band 24, FIG. 1, comprises only a tie 34 as previously described. The cross-section view of the shroud shanks 18 shown in FIG. 3 illustrates the banding of shrouds 16 by shank band 24. The periphery of the band will vary in accordance with the position along the wires. For example at FIG. 2, it is greater because the head 20 has spaced the shroud 16 apart.

If desired, an assembly fixture (not shown) may be used to position shrouds 16 in staggered fashion as illustrated in FIG. 2. By staggering the shrouds 16, the area of the assembly is reduced to permit the cluster 10 to fit between nested collector plates, as will be later described.

The cluster 10 is secured to collector plate 12 as best illustrated in FIG. 4. For a better understanding of how this is accomplished, it should be understood that a conventional collector plate 12 is made from a rectangular steel plate 42 having reinforcing steel angles 44 fastened to both faces of the plate, as by welding, along the longitudinal edges thereof as best illustrated in FIG. 7. Similar angles may be fastened to the ends of the plate 42 or a tubular bulb 46 may be effectively used as shown in FIG. 2. The angles 44 and bulbs 46 are used to stiffen plate 42, it being understood that the plates 12 are rapped during operation to dislodge dust collected thereon. Angles 44 are also used for connecting a series of plates 12 together in the precipitator to form a wide plate. The angles 44 may be bolted together to join adjacent plates.

Center stiffener angles 48 are fastened substantially along the longitudinal center of plate 42 on both faces thereof. The ends of stiffener angles 48 terminate short of the bulbs 46 as illustrated in FIG. 2. This leaves a channel 50 through which the cluster 10 may pass from one half of the plate 42 to the other without crossing over the stiffener angle 48.

Cluster 10 is secured in the position shown in FIG. 2 by providing a hole 52 in both ends of plate 12. The threaded shank 30 of anchor band 22 is placed in the hole 52 and wing nut 40 secures anchor band 22 to the plate.

A cluster clip 54 is provided for supporting cluster 10 in serpentine fashion along plate 12 between anchor bands 22. Cluster clip 54, as illustrated in FIG. 6, is formed from band iron and has a substantially open U-shaped loop 56 on one end and a substantially closed U-shaped loop 58 on the other end. These loops will be hereinafter referred to as the open and closed loops.

Closed loop 58 is adapted to fit over one leg of the angles 44 so that open loop 56 is open away from plate 12. The corners of the terminal end of the closed loop 58 are bent inward to form tabs 60 which resiliently engage the angle leg to keep the cluster clip 54 in place.

As illustrated in FIG. 4, cluster clips 54 are placed at alternate intervals along angle 44 and stiffener angle 48 to provide a serpentine path for cluster 10 between the anchor bands 22. Thus, it can be seen that the cluster 10 can be secured at one end by an anchor band 22, then strung through alternate cluster clips 54 and finally secured at the other end by another anchor band 22. The hole 52 for the latter anchor band 22 may be drilled through collector plate 12 after looping cluster 10 in cluster clips 54 to compensate for any variation in the length of the clusters 10. The masking tape is then removed from around wires 15.

As illustrated in FIG. 4, one of holes 52 is drilled in one half of plate 12 and the other is drilled in the opposite half at the opposite end of the plate. This is done to provide sufficient serpentine length to accommodate the length of cluster 10. Preferably, the shrouds 16 of one end of cluster 10 rest in the channel 50 on one end of the plate. Another cluster 10 is similarly secured to the other half of plate 12 only with shrouds 16 secured to the opposite end from the shrouds of the first cluster. It should be understood that only one cluster 10 per plate 12 is normally required. However, one plate will have two clusters for shipping purposes as will be subsequently described.

An alternate embodiment is illustrated in FIG. 8. As illustrated there the serpentine arrangement is simplified to a U-shape loop; both ends of the electrode cluster being secured at the upper portion of the plate 12.

FIG. 5 illustrates a number of plates 12 nested together to form a package 60 for shipment. The plates are suitably secured together for shipment. At spaced intervals along the pack, wood frames 57 are placed and conventional metal strapping 59 may be used to bind the plates 12 to form package 60.

It can be seen, FIG. 7, that the nested plates 12 form cells 62 between them and that cluster clips 54 substantially fill the transverse distance between the plates. Thus, with the plates 12 nested, the open loop 56 forms a closed loop with the adjacent plate 12. In this way, the clusters 10 are completely boxed inside the cells 62 for shipment. The outside plate of the package 60 does not have a cluster 10 secured to it. This latter cluster is secured to the next inside plate so that this plate carries two clusters, as previously described. In this manner, all of the clusters 10 are contained within cells 62 with none exposed to the hazards of shipment.

After the package 60 arrives at the erection site, the package 60 is disassembled, frames 57 and strapping 59 being removed. Each individual plate 12 is lifted up and placed within the framework of the precipitator, as for example, by a crane. The plates 12 are hung side by side from supporting structure (not shown) to form the lanes of the precipitator. Adjacent plates can be bolted together through the angles 44 to form wider plates if desired after the clusters 10 have been removed.

Since the clusters 10 remain secured to plate 12 during erection, they are thereby placed nearly in position for suspension from their supporting structure (not shown). The heretofore necessary task of lifting individual wires or clusters has been eliminated. To mount the electrode wires 14, the bottom end of cluster 10 is disassembled from plate 12 by removing wing nut 40 from threaded shank 30 and pulling anchor band 22 out of hole 52. Since the upper end of cluster 10 is still supported, a firm tug on the lower end of cluster 10 will pull all the cluster clips 54 off the angles 44 and the cluster will hang free from the upper anchor band 22. Cluster clips 54 fall to the bottom of the precipitator where they may be collected for reuse if desired. Tie 34 and shank band 24 are cut with pliers or the like to release wires 14. Thereafter, upper anchor band 22 may be similarly removed from plate 12 and, after cutting tie 34 and shank band 24, the individual wires 14 may be easily hung from the supporting structure. The clusters 10 are not heavy and may be easily held by hand after the upper anchor band is removed from plate 12.

The method and apparatus just described provides a much simpler, cheaper, and less time-consuming way of shipping and erecting electrodes for electrostatic precipitators. Having thus described my invention in its best embodiment and mode of operation, what I desire to claim by Letters Patent is:

1. Apparatus for handling a discharge and a collector electrode for electrostatic precipitators, comprising:
   removable anchor means mounting said discharge electrode to said collector electrode in serpentine fashion whereby said discharge electrode is confined within the periphery of said collector electrode.
2. The apparatus of claim 1, and in addition:
   banding means for fastening a plurality of said discharge electrodes in a cluster for mounting to said collector electrode.
3. The apparatus of claim 1 wherein said anchor means comprises a tie-band portion for surrounding an end of said discharge electrode, and
   a fastening portion connected to said tie-band portion and adapted for anchoring said discharge electrode to said collector electrode.
4. The apparatus of claim 1 including:
   clip means disposed between said anchor means and frictionally secured to said collector plate in alternately spaced locations thereby defining a sinuous path for said discharge electrode and being adapted to support said discharge electrode in said path between said anchor means, said clip means being removable from said collector plate by a tugging on the discharge electrode.
5. An electrode package comprising a plurality of precipitator collector electrodes nested in spaced apart relationship to form cells therebetween;
   a plurality of clusters of precipitator discharge electrodes removably anchored to said collector electrodes and contained within said cells; and
   means for securing together said collector electrodes to form said package.
6. A method of handling collector electrodes and clusters of discharge electrodes for electrostatic precipitators, comprising:
   removably anchoring said clusters to said collector electrodes;
   nesting said collector electrodes in spaced apart relationship to form cells therebetween; and
   securing together said collector electrodes to form said package for shipment to an erection site.
7. The method of claim 6, and in addition:
   disassembling said package upon arrival at said erection site;
   hanging said collector plates with said clusters secured thereto to a supporting structure in a precipitator;
   dismounting the lower end of said cluster from said collector plate; and thereafter
   removing the upper end of said cluster from said collector plate and hanging said discharge electrodes to a supporting structure in a precipitator.

References Cited
UNITED STATES PATENTS

| | | | |
|---|---|---|---|
| 2,447,933 | 8/1948 | Cummings | 55—146 |
| 2,490,139 | 12/1949 | Kuenne | 338—290 |
| 2,585,138 | 2/1952 | Landgraf | 55—141 |
| 2,746,112 | 5/1956 | Simon | 248—68 |
| 2,875,845 | 3/1959 | Penney | 55—146 |
| 3,282,029 | 11/1966 | Steuernagel | 55—141 |
| 3,283,893 | 11/1966 | Durocher et al. | 206—65 |

WILLIAM T. DIXSON, Jr., *Primary Examiner.*